United States Patent
Huang

(10) Patent No.: US 9,494,722 B2
(45) Date of Patent: Nov. 15, 2016

(54) BACKLIGHT MODULE

(75) Inventor: Jianfa Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 158 days.

(21) Appl. No.: 13/698,024

(22) PCT Filed: Aug. 10, 2012

(86) PCT No.: PCT/CN2012/079907
§ 371 (c)(1),
(2), (4) Date: Nov. 14, 2012

(87) PCT Pub. No.: WO2014/015541
PCT Pub. Date: Jan. 30, 2014

(65) Prior Publication Data
US 2014/0029294 A1    Jan. 30, 2014

(30) Foreign Application Priority Data

Jul. 27, 2012    (CN) .......................... 2012 1 0264173

(51) Int. Cl.
*F21V 8/00*    (2006.01)

(52) U.S. Cl.
CPC ........... *G02B 6/0035* (2013.01); *G02B 6/0055* (2013.01); *G02B 6/0091* (2013.01)

(58) Field of Classification Search
CPC   G02B 6/0033; G02B 6/0035; G02B 6/0055; G02B 6/0091
USPC .......................... 362/606, 608–609, 632–634
See application file for complete search history.

(56) References Cited

U.S. PATENT DOCUMENTS

| 2006/0098134 | A1 | 5/2006 | Park |
| 2009/0033827 | A1* | 2/2009 | Chen et al. ..................... 349/58 |
| 2012/0081918 | A1* | 4/2012 | Yang et al. ................... 362/608 |
| 2012/0162569 | A1 | 6/2012 | Sekiguchi et al. |
| 2012/0188790 | A1* | 7/2012 | Isobe ........................... 362/602 |
| 2012/0287355 | A1* | 11/2012 | Oya ............................. 348/790 |

FOREIGN PATENT DOCUMENTS

| CN | 101975361 A | 2/2011 |
| CN | 102081259 A | 6/2011 |
| JP | 2007-240689 A | 9/2007 |
| TW | 200730952 A | 8/2007 |

* cited by examiner

*Primary Examiner* — Laura Tso
*Assistant Examiner* — Naomi M Wolford
(74) *Attorney, Agent, or Firm* — Andrew C. Cheng

(57) ABSTRACT

The present invention provides a backlight module, which includes a backplane, a backlight source arranged inside the backplane, a light guide plate arranged inside the backplane to correspond to the backlight source, a reflector plate arranged between the light guide plate and the backplane, an optic film disposed on the light guide plate, a mold frame arranged on the backplane, and a block wall arranged between the light guide plate and the mold frame and opposing the backlight module. The block wall forms a slope face close to the backlight source. A reflective layer is formed on the slope face. Being provided between the mold frame and the light guide plate, the block wall reflects light that gets incident thereon back into the light guide plate in order to eliminate leak through a gap between an optic film assembly and the light guide plate.

11 Claims, 2 Drawing Sheets bright line backlight source side

BACKLIGHT MODULE

BACKGROUND OF THE INVENTION

1. Field of the Invention

The present invention relates to the field of liquid crystal displaying, and in particular to a backlight module that enhances brightness of light guide plate.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source of LED light bar at an edge of a backplane to be located rearward of one side of the liquid crystal panel. The LED light bar emits light that enters a light guide plate (LGP) through a light incidence face formed at one side of the light guide plate and is projected out through a light emergence face of the light guide plate, after being reflected and diffused, to transmit through an optic film assembly thereby forming a planar light source for the liquid crystal panel.

Referring to FIG. 1, in a side-edge backlight module, a gap is present invention between a mold frame and a light guide plate/optic films. In normal operations, the mold usually undergoes deformation caused by heating or other factors or the gap might be of an excessive size, whereby light from an LED light source, upon incident onto the mold frame, may project outward through such a gap, forming a bright line and thus leading to around 3% loss of brightness of the light emitting from the LED light source. Referring to FIG. 2, this situation is caused by a component of the light from the LED light source 200 getting incident to the mold frame 600. To solve such a problem, the technical solution that is conventionally taken is arranging a reflective layer 700 on the mold frame 600 at the site corresponding to the LED light source 200, the light guide plate 300, and optic film 500 in order to reflect back the light incident to the mold frame 600. However, there is still a fraction of the light that is reflected toward the gap between the light guide plate 300 and the mold frame 600 to get out and form a bright line, leading to a loss of brightness of the light emitting from the LED light source 200. With the development that uses an LED light bar to serve as the backlight module, a backlight module with a slim frame (less than 8.0 mm) is now becoming the new trend of the future development. However, in such a slim frame backlight module, the problem gets severe and becomes an issue that must be addressed immediately.

SUMMARY OF THE INVENTION

An object of the present invention is to provide a backlight module, which can well handle the bright line problem occurring at a light incidence side of a side-edge backlight module and enhance brightness of a light guide plate so as to eliminate brightness loss of light emitting from an LED light source and improve utilization rate of the LED light source.

To achieve the above object, the present invention provides a backlight module, which comprises: a backplane, a backlight source arranged inside the backplane, a light guide plate arranged inside the backplane to correspond to the backlight source, a reflector plate arranged between the light guide plate and the backplane, an optic film disposed on the light guide plate, a mold frame arranged on the backplane, and a block wall arranged between the light guide plate and the mold frame and opposing the backlight module. The block wall has a side that is close to the backlight source and forms a slope face. A reflective layer is formed on the slope face.

The light guide plate has a light emergence face. The slope face of the block wall forms an angle of 5-20° with respect to the light emergence face of the light guide plate.

The block wall is a trapezoidal wall.

The block wall is right-angled trapezoidal wall.

The block wall has a bottom face at the side thereof close to the light guide plate. The block wall is fixed to the mold frame by adhesive or screwing. The bottom face is spaced from the light guide plate by a distance of 0.2 mm, whereby after being assembled, the block wall is in tight engagement with the light guide plate.

The block wall and the mold frame are made of the same material.

The block wall and the mold frame are integrally formed with each other.

The reflective layer comprises a reflection plate attached adhesively to the slope face of the block wall or a reflective material coated on the slope face of the block wall.

The reflective layer comprises mirror reflection or white scattering reflection.

The mold frame is of a color of black or a dark color.

The present invention also provides a backlight module, which comprises: a backplane, a backlight source arranged inside the backplane, a light guide plate arranged inside the backplane to correspond to the backlight source, a reflector plate arranged between the light guide plate and the backplane, an optic film disposed on the light guide plate, a mold frame arranged on the backplane, and a block wall arranged between the light guide plate and the mold frame and opposing the backlight module, the block wall having a side that is close to the backlight source and forms a slope face, a reflective layer being formed on the slope face;

wherein the light guide plate has a light emergence face, the slope face of the block wall forming an angle of 5-20° with respect to the light emergence face of the light guide plate;

wherein the block wall is a trapezoidal wall;

wherein the block wall is right-angled trapezoidal wall;

wherein the block wall has a bottom face at the side thereof close to the light guide plate, the block wall being fixed to the mold frame by adhesive or screwing, the bottom face being spaced from the light guide plate by a distance of 0.2 mm, whereby after being assembled, the block wall is in tight engagement with the light guide plate;

wherein the block wall and the mold frame are made of the same material;

wherein the reflective layer comprises a reflection plate attached adhesively to the slope face of the block wall or a reflective material coated on the slope face of the block wall;

wherein the reflective layer comprises mirror reflection or white scattering reflection; and wherein the mold frame is of a color of black or a dark color.

The efficacy of the present invention is that the present invention provides a backlight module, wherein a block wall that carries a reflective layer is provided between a mold frame and a light guide plate at a location corresponding to a backlight source in order to reflect light that gets incident onto the block wall into the light guide plate in order to eliminate leak through a gap between an optic film assembly and the light guide plate and thus a bright line induced thereby, whereby the bright line problem occurring at a light incidence side of a side-edge backlight module can be well solved, light coupling efficiency is increased, and the brightness of the light guide plate is also enhanced to thereby eliminate brightness loss of light emitting from an LED light source and improve utilization rate of the LED light source.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
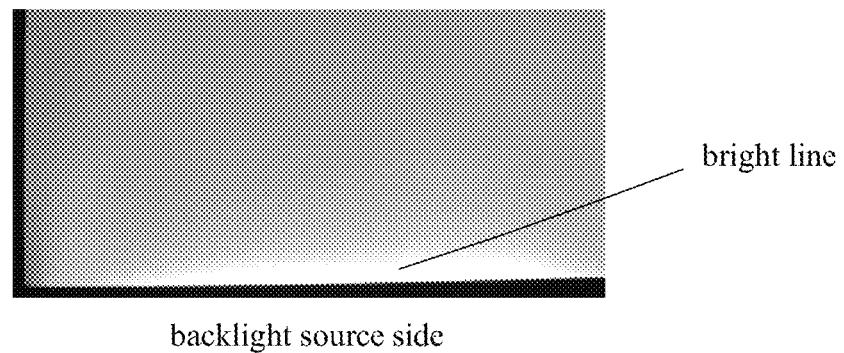
FIG. 1 is a schematic view illustrating a bright lines occurring in a display screen.
Figure 2:
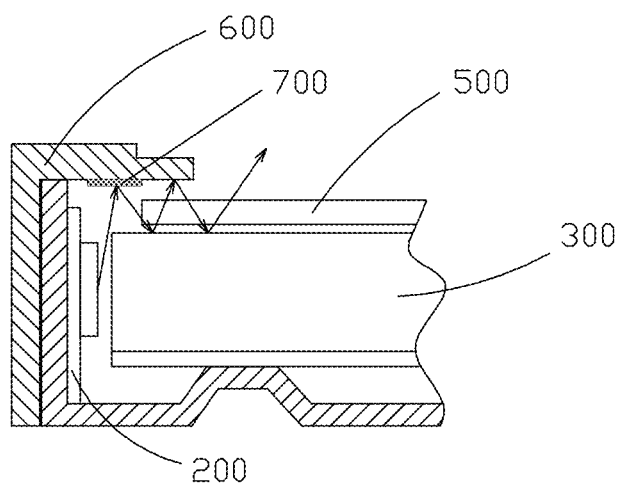
FIG. 2 is a schematic view showing the structure of a conventional backlight module that comprises a mold frame on which a reflective layer is disposed.
Figure 3:
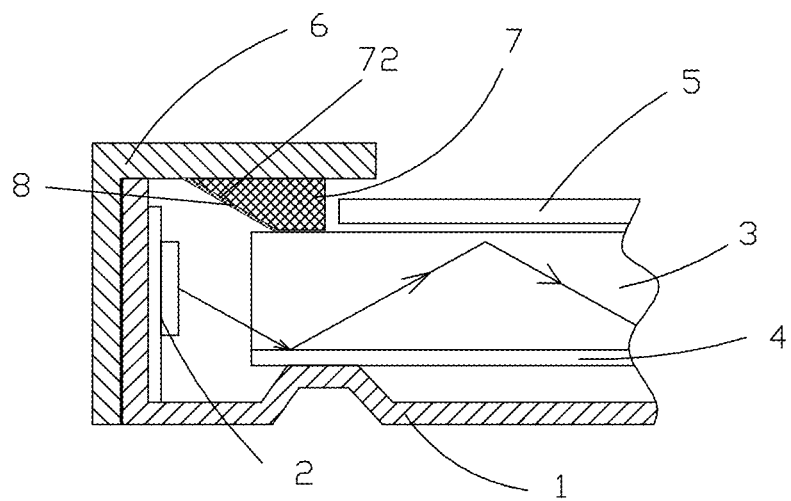
FIG. 3 is a schematic view showing the structure of a backlight module according to an embodiment of the present invention.

Referring to FIG. 3, the present invention provides a backlight module, which comprises: a backplane 1, a backlight source 2 arranged inside the backplane 1, a light guide plate 3 arranged inside the backplane 1 to correspond to the backlight source 2, a reflector plate 4 arranged between the light guide plate 3 and the backplane 1, an optic film assembly 5 disposed on the light guide plate 3, a mold frame 6 arranged on the backplane 1, and a block wall 7 arranged between the light guide plate 3 and the mold frame 6 and opposing the backlight module 2. The block wall 7 has a side that is close to the backlight source 2 and forms a slope face 72. A reflective layer 8 is formed on the slope face 72. The reflective layer 8 formed on the block wall 7 reflects light that emits from the backlight source 2 and gets incident onto the block wall 7 back into the light guide plate 3 in order to prevent the light from being refracted to leak through a gap between the optic film assembly 5 and the light guide plate 3, whereby the bright line problem of the conventional backlight modules can be well solved, light coupling efficiency is increased, and the brightness of the light guide plate 3 is also enhanced (by increasing around 2-3%) to thereby increase the utilization efficiency of energy.

The light guide plate 3 has a light emergence face (not labeled). The slope face 72 of the block wall 7 forms an angle of 5-20° with respect to the light emergence face of the light guide plate 3. In a preferred embodiment of the present invention, the block wall 7 is a trapezoidal wall, preferably a right-angled trapezoidal wall.

In the separated arrangement of the block wall 7 from the mold frame 6 and being fixed to the mold frame 6 by means of adhesives or screwing, the block wall 7 and the mold frame 6 can be made of the same material. The block wall 7 has a bottom face at the side thereof close to the light guide plate 3. For the purposes of machining and assembling tolerance, the bottom face is spaced from the light guide plate 3 by a distance of 0.2 mm. After being assembled, the block wall 7 and the light guide plate 3 are set in engagement with each other to achieve an effect of tightly fixing and holding down the light guide plate 3.

The reflective layer 8 can be a reflection plate attached adhesively to the slope face 72 of the block wall 7, but is not limited thereto. The reflective layer 8 can alternatively be a reflective material coated on the slope face 72 of the block wall 7. The reflective layer 8 can be a reflection plate that effect mirror surface reflection or alternatively a mirror surface reflection layer made of a reflective material to provide better light coupling efficiency. Or alternatively, a reflection plate that effects white scattering reflection can be used, or a white scattering reflection layer that is made of a reflection material can be used for reducing the manufacture cost.

To provide an improved optic performance, the mold frame 6 is preferably of a color of black or a dark color.

Figure 4:
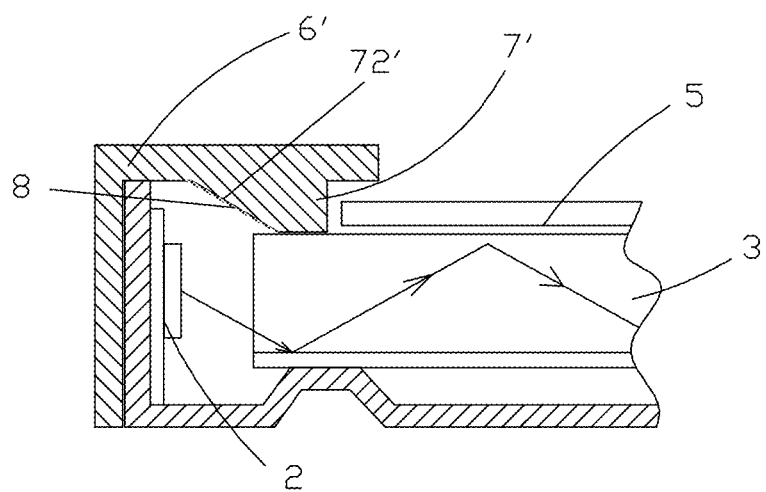
FIG. 4 is a schematic view showing the structure of a backlight module according to another embodiment of the present invention.

Referring to FIG. 4, an optional preferred embodiment is provided. The block wall 7' and the mold frame 6' are integrally formed with each other. The mold frame 6' forms a trapezoidal block wall 7' at a location corresponding to a backlight source 2 and a light guide plate 3. The trapezoidal block wall 7' has a slope face 72' on which a reflective layer 8 is provided to reflect light that emits from the backlight source 2 and gets incident onto the block wall 7' back into the light guide plate 3 in order to prevent the light from being refracted to leak through a gap between the optic film assembly 5 and the light guide plate 3, whereby the bright line problem of the conventional backlight modules can be well solved, light coupling efficiency is increased, and the brightness of the light guide plate 3 is also enhanced (by increasing around 2-3%) to thereby increase the utilization efficiency of energy.

In summary, the present invention provides a backlight module, wherein a block wall that carries a reflective layer is provided between a mold frame and a light guide plate at a location corresponding to a backlight source in order to reflect light that gets incident onto the block wall into the light guide plate in order to eliminate leak through a gap between an optic film assembly and the light guide plate and thus a bright line induced thereby, whereby the bright line problem occurring at a light incidence side of a side-edge backlight module can be well solved, light coupling efficiency is increased, and the brightness of the light guide plate is also enhanced to thereby eliminate brightness loss of light emitting from an LED light source and improve utilization rate of the LED light source.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a backlight source arranged inside the backplane, a light guide plate arranged inside the backplane to have an end thereof correspond to the backlight source, a reflector plate arranged between the light guide plate and the backplane, an optic film disposed on the light guide plate, a mold frame arranged on the backplane, and a block wall arranged between the light guide plate and the mold frame and opposing the backlight source, the block wall having a bottom that faces the light guide plate and a side that is close to and faces the backlight source and forms a slope face having a first end connected to the bottom of the block wall and a second, opposite end connected to the mold frame, a reflective layer that is formed on the slope face to completely cover the side of the block wall such that an end of the reflective layer overlaps the second end of the slope face that is connected to the mold frame and is spaced from the backlight source in a direction of light transmitting from the backlight source toward the end of the light guide plate to thereby set the reflective layer, in the entirety thereof, aside of the backlight source in the direction of light transmitting from the backlight source toward the end of the light guide plate so as to redirect and prevent light from transmitting toward a gap between the a top portion of the mold frame and the light guide plate, wherein the bottom of the block wall is in direct engagement with the light guide plate.

2. The backlight module as claimed in claim 1, wherein the light guide plate has a light emergence face, the slope face of the block wall forming an angle of 5-20° with respect to the light emergence face of the light guide plate.

3. The backlight module as claimed in claim 2, wherein the block wall is a trapezoidal wall.

4. The backlight module as claimed in claim 3, wherein the block wall is right-angled trapezoidal wall.

5. The backlight module as claimed in claim 3, wherein the block wall has a bottom face at the side thereof close to the light guide plate, the block wall being fixed to the mold frame by adhesive or screwing, the bottom face being spaced from the light guide plate by a distance of 0.2 mm, whereby after being assembled, the block wall is in tight engagement with the light guide plate.

6. The backlight module as claimed in claim 1, wherein the block wall and the mold frame are made of the same material.

7. The backlight module as claimed in claim 6, wherein the block wall and the mold frame are integrally formed with each other.

8. The backlight module as claimed in claim 1, wherein the reflective layer comprises a reflection plate attached adhesively to the slope face of the block wall or a reflective material coated on the slope face of the block wall.

9. The backlight module as claimed in claim 8, wherein the reflective layer comprises mirror reflection or white scattering reflection.

10. The backlight module as claimed in claim 1, wherein the mold frame is of a color of black or a dark color.

11. A backlight module, comprising: a backplane, a backlight source arranged inside the backplane, a light guide plate arranged inside the backplane to have an end thereof correspond to the backlight source, a reflector plate arranged between the light guide plate and the backplane, an optic film disposed on the light guide plate, a mold frame arranged on the backplane, and a block wall arranged between the light guide plate and the mold frame and opposing the backlight source, the block wall having a bottom that faces the light guide plate and a side that is close to and faces the backlight source and forms a slope face having a first end connected to the bottom of the block wall and a second, opposite end connected to the mold frame, a reflective layer that is formed on the slope face to completely cover the side of the block wall such that an end of the reflective layer overlaps the second end of the slope face that is connected to the mold frame and is spaced from the backlight source in a direction of light transmitting from the backlight source toward the end of the light guide plate to thereby set the reflective layer, in the entirety thereof, aside of the backlight source in the direction of light transmitting from the backlight source toward the end of the light guide plate so as to redirect and prevent light from transmitting toward a gap between the a top portion of the mold frame and the light guide plate, wherein the bottom of the block wall is in direct engagement with the light guide plate;

wherein the light guide plate has a light emergence face, the slope face of the block wall forming an angle of 5-20° with respect to the light emergence face of the light guide plate;

wherein the block wall is a trapezoidal wall;

wherein the block wall is right-angled trapezoidal wall;

wherein the block wall has a bottom face at the side thereof close to the light guide plate, the block wall being fixed to the mold frame by adhesive or screwing, the bottom face being spaced from the light guide plate by a distance of 0.2 mm, whereby after being assembled, the block wall is in tight engagement with the light guide plate;

wherein the block wall and the mold frame are made of the same material;

wherein the reflective layer comprises a reflection plate attached adhesively to the slope face of the block wall or a reflective material coated on the slope face of the block wall;

wherein the reflective layer comprises mirror reflection or white scattering reflection; and wherein the mold frame is of a color of black or a dark color.

* * * * *